Figure 1:
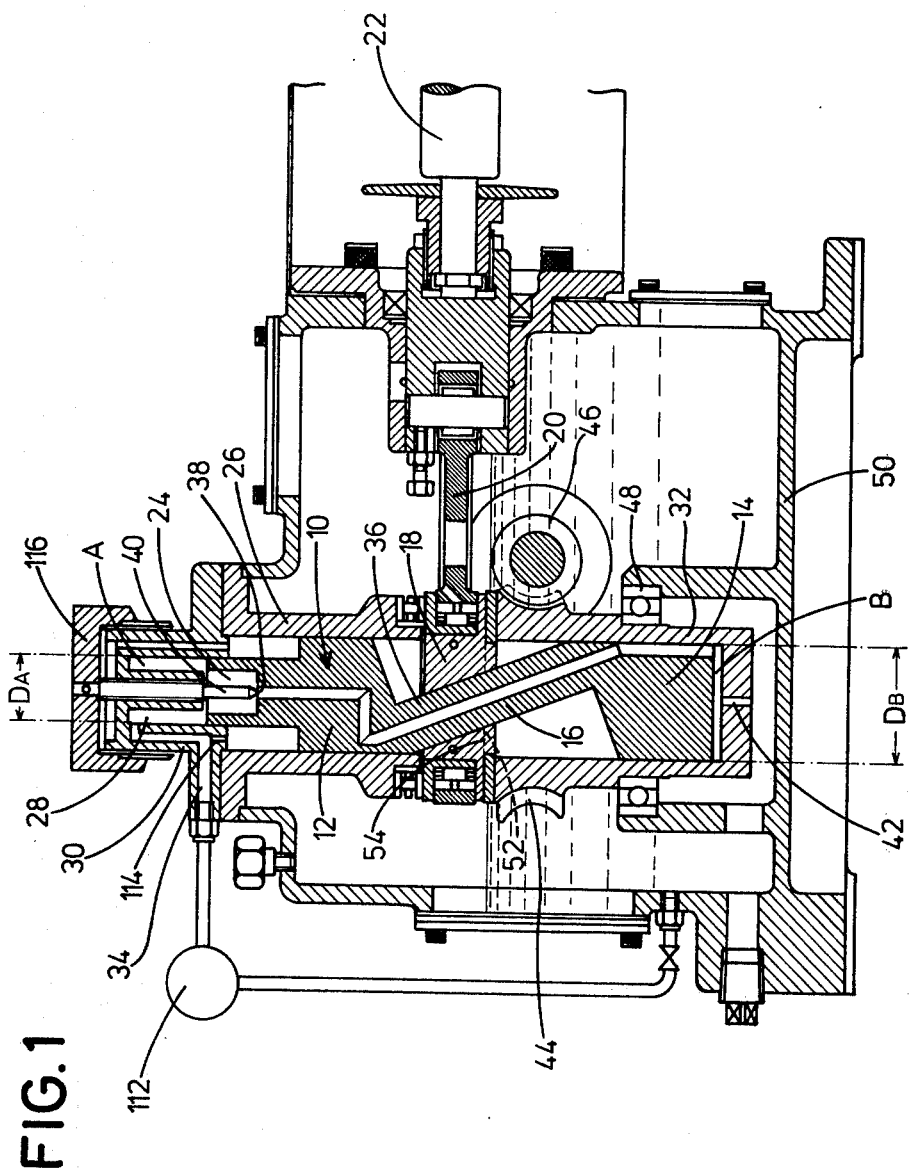

United States Patent [19]

Sato et al.

[11] 4,041,800
[45] Aug. 16, 1977

[54] STROKE LENGTH ADJUSTING DEVICES

[75] Inventors: Ryuichi Sato; Teruo Oikawa; Masahiro Nakata, all of Tokyo, Japan

[73] Assignee: Nikkiso Co., Ltd., Tokyo, Japan

[21] Appl. No.: 608,223

[22] Filed: Aug. 27, 1975

[30] Foreign Application Priority Data

Apr. 7, 1975 Japan .................................. 50-42093
Apr. 7, 1975 Japan .................................. 50-42094

[51] Int. Cl.² ......................................... G05G 1/00
[52] U.S. Cl. .............................................. 74/571 R
[58] Field of Search ...................................... 74/571

[56] References Cited
U.S. PATENT DOCUMENTS

| 2,062,241 | 11/1936 | Viberg | 74/571 |
| 2,348,958 | 5/1944 | Celio | 74/571 |
| 2,592,237 | 4/1952 | Bradley | 74/571 |
| 3,119,280 | 1/1964 | Mann et al. | 74/571 |
| 3,600,957 | 8/1971 | Stoffel | 74/571 |

Primary Examiner—Samuel Scott
Assistant Examiner—Wesley S. Ratliff, Jr.

[57] ABSTRACT

A stroke length adjusting device which can be applied to a mechanism for converting a rotary motion into a reciprocating motion is disclosed. The device comprises two oil pressure chambers communicated through a bore with each other and a crank arranged between these two oil pressure chambers. A pressure balance between the two oil pressure chambers permits the crank to displace in its axial direction so as to adjust a stroke length of the reciprocating motion.

8 Claims, 5 Drawing Figures

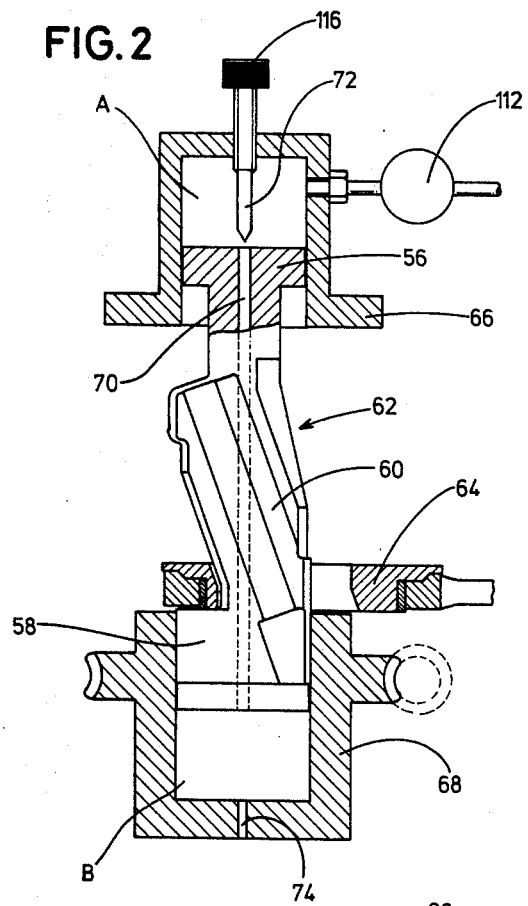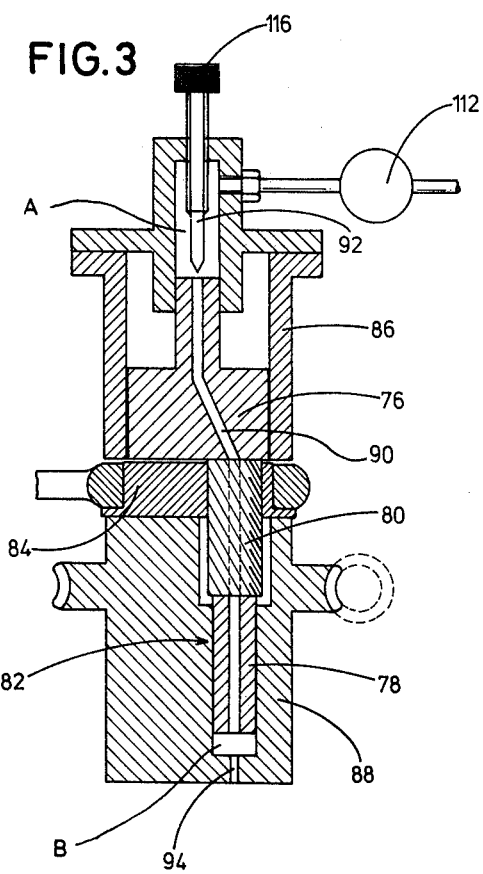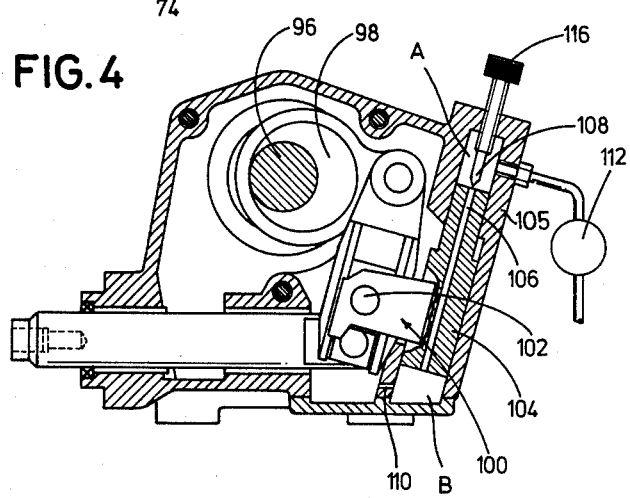

STROKE LENGTH ADJUSTING DEVICES

This invention relates to a stroke length adjusting device which can be applied to a mechanism for converting a rotary motion into a reciprocating motion so as to adjust a stroke length of the reciprocating motion with the aid of oil pressure.

As a mechanism for converting a rotary motion into a reciprocating motion, various kinds of cranks have heretofore been proposed and carried out into effect. These cranks are usually constructed so as to adjust a stroke length of the reciprocating motion. In a conventional stroke length adjusting device, a member for adjusting the stroke length is connected to a lead screw which is rotated so as to displace the adjusting member, thereby rectilinearly adjusting the stroke length of the reciprocating motion from 0 to 100%.

The above mentioned stroke length adjusting device which makes use of the lead screw, however, has the disadvantage that the load of the adjusting member as a whole is subjected to the lead screw, and as a result, a considerably strong torque is required for operating the lead screw, that in the case of maintaining a continuous motion with a desired stroke length, a reciprocating mechanism such as a connecting rod and the like causes reciprocating shocks occurred in a repeated manner to apply stress to a joint between the lead screw and the adjusting member, so that there is a risk of the joint being broken unless the lead screw is precisely worked so as to eliminate a loose engagement between the lead screw and the adjusting member whereby the lead screw becomes very expensive, and that a reaction force subjected to the lead screw causes the lead screw to rotate and the adjusting member set position becomes displaced, thereby gradually changing the stroke length.

In addition, the conventional stroke length adjusting device which makes use of the lead screw makes its mechanism large in size and requires a considerably large adjusting power. As a result, particularly in the case of constructing the stroke length adjusting device so as to effect an automatic adjustment, additional installations such as a servomotor and the like become large in size and expensive in manufacturing cost. In addition, such automatic stroke length adjusting device provides a material increase in consumed electric power or amount of air and air pressure for a pneumatic type device and hence the device is not economical. In addition, such automatic stroke length adjusting device requires a long servotimes and its response becomes degraded.

The inventors have found out by their enthusiastic study that by providing at each end of a mechanism for converting a rotary motion into a reciprocating motion with a pressure chamber, for example, an oil pressure chamber, by communicating these pressure chambers with each other through a bore, by providing one of these pressure chambers with a variable throttle valve, while providing another pressure valve with a stationary orifice drain, by supplying an operating oil from one of the pressure chambers to another pressure chamber, by displacing the converting mechanism in response to a set position of the variable throttles valve, and by making the pressure in both the pressure chambers in balance, it is possible to set the stroke length of the reciprocating motion to any desired length.

An object of the invention, therefore, is to provide a stroke length adjusting device which comprises a mechanism for converting a rotary motion into a reciprocating motion and provided at its each end with a pressure chamber and which makes use of an oil pressure so as to adjust the stroke length of the reciprocating motion to any desired length.

A feature of the invention is the provision of a stroke length adjusting device comprising a mechanism for converting a rotary motion into a reciprocating motion, said mechanism being provided at its each end with a pressure chamber, said pressure chambers being communicated through a bore with each other so as to make the pressure in said two pressure chambers in balance, thus adjusting the stroke length of the reciprocating motion.

The above mentioned mechanism for converting the rotary motion into the reciprocating motion may be constituted by a crank composed of two rotary bodies opposed with each other and of an inclined shaft portion arranged between these two rotary bodies and made integral therewith and by a cam engaged with the inclined shaft portion. The rotary bodies may be provided at their outer ends with oil pressure chambers, respectively. The rotary bodies and the inclined shaft portion may be extended through by a bore so as to communicate the two oil pressure chambers with each other. The pressure balance between the two oil pressure chambers permits the crank to displace in its axial direction.

Another feature of the invention, therefore, is the provision of a stroke length adjusting device in which a mechanism for converting a rotary motion into a reciprocating motion comprises a crank composed of two rotary bodies opposed with each other and an inclined shaft portion arranged between these two rotary bodies and made integral therewith and a cam engaged with the inclined shaft portion, the rotary bodies being provided at their outer ends with oil pressure chambers, respectively, the rotary bodies and the inclined shaft portion being extended through by a bore so as to communicate the two oil pressure chambers with each other, and the pressure balance between the two oil pressure chambers permitting the crank to displace in its axial direction.

Alternatively, the mechanism for converting a rotary motion into a reciprocating motion may be constituted by a crank composed of two rotary bodies opposed with each other and of an inclined shaft portion arranged between the two opposed rotary bodies and having a groove and by an eccentric wheel engaged with the inclined shaft portion. The rotary bodies may be provided at their outer ends with oil pressure chambers, respectively. The rotary bodies and the enclined shaft portion may be extended through by a bore so as to communicate the two oil pressure chambers with each other. Also, in this case the pressure balance between the two oil pressure chambers permits the crank to displace in its axial direction.

A further feature of the invention, therefore, is the provision of a stroke length adjusting device, in which the mechanism for converting a rotary motion into a reciprocating motion comprises a crank composed of two rotary bodies opposed with each other and an inclined shaft portion arranged between the two opposed rotary bodies and having a groove and an eccentric wheel engaged with the inclined shaft portion, the rotary bodies being provided at their outer ends with oil pressure chambers, respectively, the rotary bodies and the inclined shaft portion being extended through by a bore so as to communicate the two oil pressure chambers with each other, and the pressure balance between the two oil pressure chambers permitting the crank to displace in its axial direction.

In the stroke length adjusting device according to the invention, the mechanism for converting a rotary motion into a reciprocating motion may also be constituted by a crank composed of two rotary bodies opposed with each other and of an eccentric screw threaded shaft portion arranged between the two opposed rotary bodies and by a cam threadedly engaged with the eccentric screw threaded shaft portion. The rotary bodies may be provided at their outer ends with oil pressure chambers, respectively. The rotary bodies and the eccentric screw threaded shaft portion may be extended through by a bore so as to communicate the two oil pressure chambers with each other. Also, in this case the pressure balance between the two oil pressure chambers permits the crank to displace in its axial direction.

A still further feature of the invention, therefore, is the provision of a stroke length adjusting device in which the mechanism for converting a rotary motion into a reciprocating motion comprises a crank composed of two rotary bodies opposed with each other, an eccentric screw threaded shaft portion arranged between the two opposed rotary bodies and a cam threadedly engaged with the eccentric screw threaded shaft portion, the rotary bodies being provided at their outer ends with oil pressure chambers, respectively, the rotary bodies and the eccentric screw threaded shaft portion being extended through by a bore so as to communicate the two oil pressure chambers with each other, and the pressure balance between the two oil pressure chambers permitting the crank to displace in its axial direction.

As another alternative, the mechanism for converting a rotary motion into a reciprocating motion may be constituted by a rotary shaft, an eccentric wheel secured to the rotary shaft and a swinging crank pivotally mounted on the eccentric wheel. The swinging crank may be provided with a crank pin slidably mounted thereon.

The crank pin may be operatively connected to an adjusting shaft and the adjusting shaft may be provided at its outer ends with oil pressure chambers, respectively. The adjusting shaft may be extended through by a bore so as to communicate the two oil pressure chambers with each other. Also, in this case, the pressure balance between the two oil pressure chambers permits the crank pin to displace in an axial direction of the swinging crank.

Another feature of the invention, therefore, is the provision of a stroke length adjusting device, in which the mechanism for converting a rotary motion into a reciprocating motion comprises a rotary shaft, an eccentric wheel secured to the rotary shaft and a swinging crank pivotally mounted on the eccentric wheel and including a crank pin slidably mounted thereon, the crank pin being operatively connected to an adjusting shaft which is provided at its outer ends with oil pressure chambers, respectively, the adjusting shaft being extended through by a bore so as to communicate the two oil pressure chambers with each other, and the pressure balance between the two oil pressure chambers permitting the crank pin to displace in an axial direction of the swinging crank.

In the stroke length adjusting device constructed as above described, provision may be made of a variable throttle valve opposed to an end opening of the bore communicated with one of the two oil pressure chambers and an orifice drain open to another oil pressure chamber, so that feeding of the operating oil from one of the oil pressure chambers to another oil pressure chamber causes means for converting the rotary motion into the reciprocating motion to displace in such a direction that the pressure between the two oil pressure chambers becomes balanced so as to easily adjust the stroke length to any desired length.

A further feature of the invention, therefore, is the provision of a stroke length adjusting device comprising further a variable throttle valve opposed to an end opening of the bore communicated with one of the oil pressure chambers and an orifice drain open to another oil pressure chamber.

Also, in the stoke adjusting device constructed as above described, the mechanism for converting a rotary motion into a reciprocating motion may be arranged in an oil tank. The oil in the oil tank may cyclically be fed from one of the oil pressure chambers through an oil pressure pump to another oil pressure chamber. In this case, both a lubrication of stroke length adjusting mechanism parts and an adjustment of the stroke length may be effected with the aid of the oil in the oil tank in a convenient and simple manner.

A still further feature of the invention, therefore, is the provision of a stroke adjusting device in which the mechanism for converting a rotary motion into a reciprocating motion is arranged in an oil tank, the oil in the oil tank being cyclically fed through an oil pressure pump to the oil pressure chambers.

However, in such kind of stroke length adjusting device, provision must be made of an oil pressure pump for the purpose of always maintaining a suitable oil pressure. For this purpose, it is necessary to provide means for driving and controlling the oil pressure pump independently of the stroke length adjusting device.

The inventors have found out by their further study that by arranging the mechanism for converting the rotary motion into the reciprocating motion in an oil tank, directly opening the orifice drain provided for one of the oil pressure chambers into the oil tank, providing a cam operatively associated with means for converting a rotary motion into a reciprocating motion and providing a reciprocating oil pressure pump having a plunger engaged with the cam, it is possible to cyclically feed the oil in the oil tank through the reciprocating oil pressure pump to the oil pressure chambers and effect the oil pressure pump operation and the stroke length adjustment in a simple manner by using a driving mechanism which also drives the mechanism for converting the rotary motion into the reciprocating motion.

Another feature of the invention, therefore, is the provision of a stroke length adjusting device and comprising a further a cam operatively associated with means for converting a rotary motion into a reciprocating motion and a reciprocating oil pressure pump having a plunger engaged with the cam, the oil in the oil tank being cyclically fed from one of the oil pressure chambers through the reciprocating oil pressure pump to another oil pressure chamber.

Other objects and advantages of the present invention will become apparent as the detailed description thereof proceeds.

The invention will now be described in greater detail with reference to the accompanying drawings, wherein:

FIG. 1 is a longitudinal sectional view of one embodiment of a stroke length adjusting device according to the invention; and FIGS. 2 to 5 are longitudinal sectional views of various embodiments thereof, respectively.

Referring to FIG. 1, reference numeral 10 designates a crank constituted by a pair of rotary bodies 12, 14 opposed to each other and an inclined shaft portion 16 arranged between the rotary bodies 12, 14 and made integral with these rotary bodies 12, 14, the inclined shaft portion 16 being inclined from a center axis common to both the rotary bodies 12, 14 by a given angle. With the inclined shaft portion 16 is engaged a cam 18 for converting a rotary motion of the crank 10 into a reciprocating motion. The cam 18 is connected through a connecting rod 20 to a plunger 22 of a pump (not shown).

One of the rotary bodies 12 of the crank 10 is provided at its one end with a hollow cylindrical portion 24. The rotary body 12 is surrounded by a stationary sleeve 26 whose outer end is hermetically closed by an end closing member 30 provided at its inside with the hollow member 28 with which is engaged a hollow cylindrical portion 24 of the rotary body 12.

On the other hand, another rotary body 14 is surrounded by a rotary sleeve 32 closed at its one end.

To the end closing member 30 is connected an oil pressure conduit 34 so as to constitute an oil pressure chamber A together with the hollow member 28.

Provision is made of a bore 36 which extends from the center portion of the rotary body 12 of the crank 10 through the inclined shaft portion 16 and the inside of the rotary body 14 to the outer end thereof so as to constitute an oil pressure chamber B at that outer end of the rotary body 14 which is surrounded by the rotary sleeve 32.

In the oil pressure chamber A constructed as above described, a needle 40 is threadedly engaged with the end closing member 30 so as to be forwardly and backwardly movable in an axial direction. The needle 40 is opposed to an open end 38 of the bore 36 to constitute a variable throttle valve.

In the other oil pressure chamber B, the rotary sleeve 32 is provided at its base portion with an orifice drain 42 open to the oil pressure chamber B.

In this manner, if the needle 40 arranged in the oil pressure chamber A is moved to a desired position, an operating oil in the oil pressure chamber A flows through the bore 36 in the crank 10 into the pressure chamber B to increase the pressure in the oil pressure chamber B, resulting in a movement of the crank 10 toward the oil pressure chamber A. When the open end 38 of the bore 36 of the rotary body 12 approaches to the lower end 38 of the needle 40, this open end 38 together with the needle 40 constitutes a throttle valve which reduces the operating oil flown from the oil pressure chamber A into the bore 36, thereby making a pressure difference between the oil pressure chamber A and the oil pressure chamber B constant.

In this manner, when the pressure difference between the oil pressure chamber A and the oil pressure chamber B becomes constant, the axial movement of the crank 10 is stopped.

On the other hand, the oil pressure chamber B is communicated with the orifice drain 42, so that when the pressure in the oil pressure chamber A is in balance with the pressure in the oil pressure chamber B, the operating oil always flows from the oil pressure chamber A through the bore 36, pressure chamber B and orifice drain 42 into an oil tank 50.

Let the inner diameter of the oil pressure chamber A be $D_A$, the inner diameter of the oil pressure chamber B be $D_B$ and $D_A < D_B$, the balanced condition in which the difference between the pressure $P_A$ in the oil pressure chamber A and the pressure $P_B$ in the oil pressure chamber B is constant is given by the following formula $$P_A \times \frac{\pi D_A^2}{4} = P_B \times \frac{\pi D_B^2}{4} \quad (1)$$

The pressure $P_A$ is determined by the degree of opening of the variable throttle valve and the crank 10 is held at a position determined by this degree of opening of the variable throttle valve.

From this balanced condition, if the needle 40 is moved upwardly, for example, the variable throttle valve becomes open, so that the reduced pressure $\Delta P_A$ becomes substantially negligibly small, thereby making the pressure in the oil pressure chamber A substantially equal to the pressure in the oil pressure chamber B.

Since $D_A < D_B$, the force subjected to each end of the crank 10 is given by $$P_A \times \frac{\pi D_A^2}{4} < P_B \times \frac{\pi D_B^2}{4} \quad (2)$$

As a result, the crank 10 is pushed upwardly and then stopped at a position where the above formula (1) is satisfied under a semi-closed condition of the variable throttle valve.

From the balanced condition, if the needle 40 is moved downwardly, the variable throttle valve becomes closed, so that substantially no oil flows through the bore 36 into the oil pressure chamber B. As a result, the pressure in the oil pressure chamber B becomes substantially zero. Then, the pressure in the oil pressure chamber A only causes the crank 10 to move downwardly until the balanced condition is established again.

In this manner, when an adjustment in position of the needle 40 opposed to the open end 38 of the bore 36 of the crank 10 is effected, the crank 10 is displaced in a rapid and easy manner and hence the relative position of the cam 18 with respect to the crank 10 is adjusted so as to adjust the rectilinear stroke over 0 to 100% in a simple manner.

In the present embodiment, the rotary sleeve 32 is provided at its outer peripheral surface portion with a worm wheel 44 threadedly engaged in a worm shaft 46 operatively connected to a driving mechanism (not shown). The rotary sleeve 32 is rotatably journalled in a radial bearing 48 mounted on the oil tank 50.

The rotary sleeve 32 is provided at its upper end with a groove 52 which is equal in width to the rotary sleeve 32 and engages with a ridge 54 projected from the base surface of the cam 18. As a result, both the rotary sleeve 32 and the cam 18 constitute one rotary body which transmits a reciprocal motion to the plunger 22 for operating the pump (not shown).

In FIG. 2 is shown another embodiment of the stroke length adjusting device according to the invention. In the present embodiment, the mechanism for converting the rotary motion into the reciprocating motion comprises a crank 62 composed of two rotary bodies 56, 58 and an inclined shaft portion 60 inserted between the two rotary bodies 56, 58 and having a groove, and an eccentric wheel 64 secured to the inclined shaft portion 60. In the present embodiment, the rotary body 56 is surrounded by a stationary sleeve 66, while the rotary body 58 is surrounded by a rotary sleeve 68. The outer ends of the rotary bodies 56, 58 are closed by the stationary and rotary sleeves 66, 68 so as to form an oil pressure chamber A and an oil pressure chamber B, respectively.

Provision is made of a bore 70 extended through the rotary bodies 56, 58 and the inclined shaft portion 60 so as to communicate the two oil pressure chambers A, B with each other.

In the oil pressure chamber A is arranged a needle 72 opposed to the end opening of the bore 70 so as to constitute a variable throttle valve. The oil pressure chamber B is provided at its closed base portion with an orifice drain 74.

As a result, if the needle 72 arranged in the oil pressure chamber A is set to a desired position, the stroke length can be adjusted in the same manner as in the previous embodiment.

In FIG. 3 is shown a further embodiment of the stroke length adjusting device according to the invention. In the present embodiment, the mechanism for converting the rotary motion into the reciprocating motion comprises a crank 82 composed of two rotary bodies 76, 78 and an eccentric screw threaded shaft portion 80 inserted between the two rotary bodies 76, 78 and a cam 84 threadedly engaged with the eccentric screw threaded shaft portion 80.

In the present embodiment, the rotary bodies 76, 78 are surrounded by a stationary sleeve 86 and a rotary sleeve 88, which close the outer ends of the rotary bodies 76, 78 so as to constitute an oil pressure chamber A and an oil pressure chamber B, respectively.

Provision is made of a bore 90 extended through the rotary bodies 76, 78 and the eccentric shaft portion 80 to communicate the two oil pressure chambers A, B with each other. In the oil pressure chamber A is arranged a needle 92 opposed to the end opening of the bore 90 so as to constitute a variable throttle valve. The oil pressure chamber B is provided at its base portion with an orifice drain 94.

Also, in the present embodiment, if the needle 92 is set to a desired position, it is possible to effect a suitable stroke length adjustment in the same manner as in the previous embodiments.

In FIG. 4 is shown a still further embodiment the stroke length adjusting device according to the invention. In the present embodiment, the mechanism for converting the rotary motion into the reciprocating motion comprises an eccentric wheel 98 secured to a rotary shaft 96 and a swinging crank 100 pivotally mounted on the eccentric wheel 98. On the swinging crank 100 is slidably mounted a crank pin 102 which is connected to an adjusting shaft 104. The adjusting shaft 104 is surrounded by a casing 105 so as to constitute an oil pressure chamber A and an oil pressure chamber B at the outer ends of the adjusting shaft 104, respectively. Through the adjusting shaft 104 is extended a bore 106 which communicate the two oil pressure chambers A, B with each other.

In the oil pressure chamber A is arranged a needle 108 opposed to the end opening of the bore 106 so as to constitute a variable throttle valve. The oil pressure chamber B is provided at its side wall portion with an orifice drain 110.

In the present embodiment, if the needle 108 is set to a desired position, it is possible to adjust the position of the crank pin 102, thereby effecting a suitable stroke length adjustment.

In the embodiment shown in FIG. 1, the crank 10 is vertically arranged in the oil tank 50, so that it is possible to lubricate the mechanism parts and supply the oil in the oil tank 50 to an oil pressure pump 112. As a result, the oil in the oil tank 50 may be circulated under pressure.

The oil pressure pump 112 may be of an independently driven type, but it may be arranged at the end of a driving worm shaft of a main pump. In this manner, the oil pressure pump 112 may be driven by the driving force for operating the main pump.

In addition, the advantage of the use of the oil pressure system lies in the fact that provision of a small hole 114 in the oil conduit 34 permits a mechanical part above the oil level in the oil tank 50, for example, the rotary body 12 to be sufficiently fed with oil with substantial elimination of an expensive forced oil lubricating mechanism and the like.

The device according to the invention is capable of displacing the crank under oil pressure in a smooth manner by adjusting the position of the needle, so that use may be made of a manually operating knob 116 made integral with the needle 40 so as to constitute the knob 116 as a stroke length adjusting gauge. As a result, it is possible to adjust the needle 40 with the aid of an extremely smallpower, so that an automatic stroke length adjustment may be effected by means of an extremely small driving mechanism.

Figure 5:
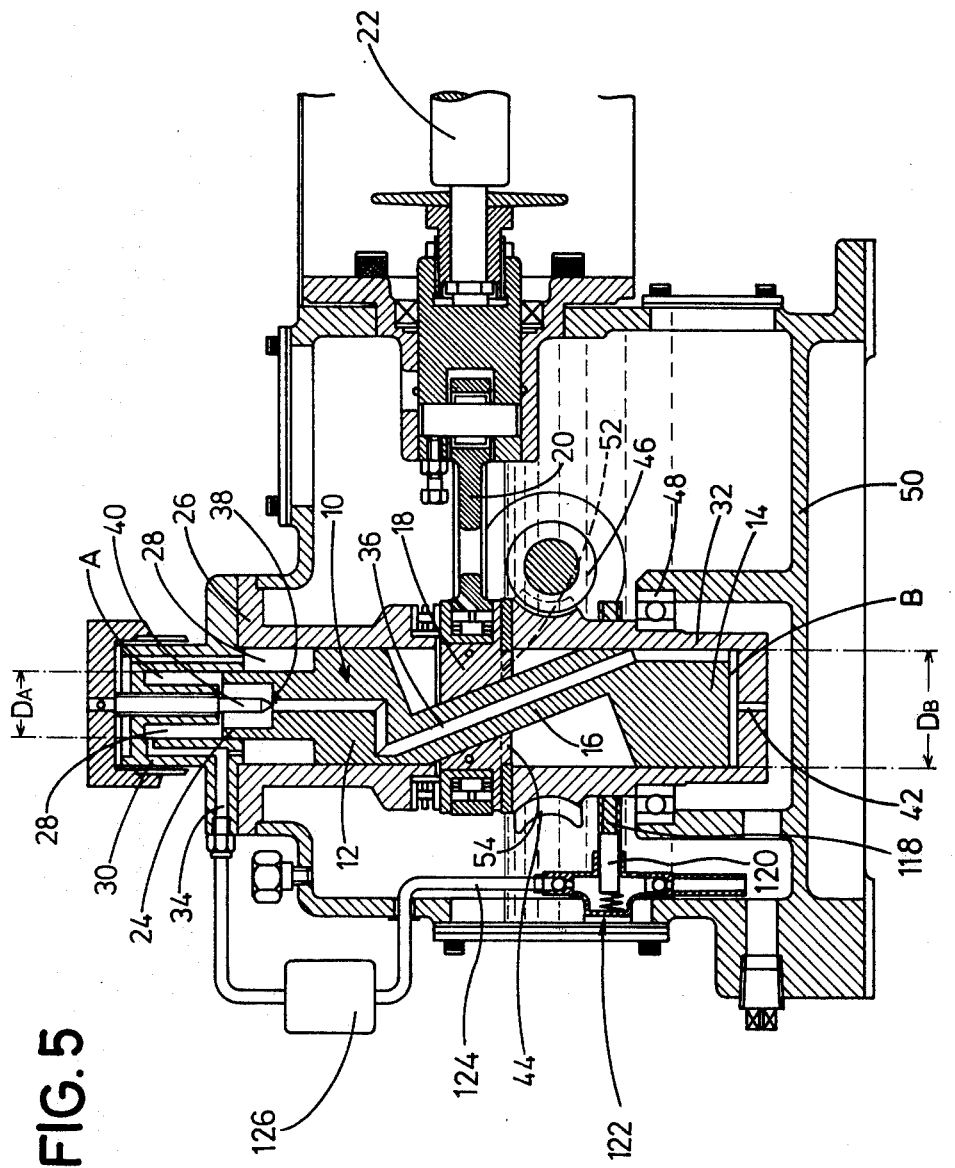

In FIG. 5 is shown another embodiment of the device according to the invention. In the present embodiment, the rotary sleeve 32 of the crank 10 vertically arranged in the oil tank 50 is provided at its outer periphery with an eccentric cam 118 which is engaged with a piston or a plunger 120 so as to effect its reciprocating motion. The plunger 120 constitutes a driving part of a reciprocating oil pressure pump 122 arranged in the oil tank 50.

The oil pressure pump 122 constructed and arranged as above described is provided with an exhaust pipe 124 which is connected through an accumulator 126 to the oil pressure conduit 34 communicated with the oil pressure chamber A. In this way, it is possible to use the oil in the oil tank 50 as the operating oil for adjusting the stroke length. In addition, a mechanism for operating the crank 10 can also operate the oil pressure pump 122 in a simple manner and hence the device as a whole can be made simplified.

In the present embodiment, if the exhaust stroke of the oil pressure pump 122 is displaced in phase such that this exhaust stroke is effected when the suction stroke of the main pump is effected, since the power for driving the main pump is delivered from that torque of the main pump which is required when the exhaust stroke of the main pump is effected, the power at the time of suction which is substantially equal to no load can be used as the oil pressure operating power without subjecting any surplus burden to the driving mechanism.

The present embodiment has the advantage that the reciprocating driving oil pump may easily be mounted on the cam secured to the rotary mechanism of means for converting the rotary motion into the reciprocating motion.

It will be understood that while the invention has been described with reference to preferred embodiments thereof, the device according to the invention may be applied to stroke length adjusting devices for mechanisms for driving various types of reciprocating pumps and various changes in design may be made within the scope without departing the spirit of the invention.

What is claimed is:

1. Apparatus for converting rotary motion into reciprocating motion, comprising a housing, rotating crank means axially movable within said housing and adapted to be coupled to a linearly movable member, said crank means being connected to a pair of opposed rotating bodies cooperating with said housing to form pressure chambers, means for supplying a fluid media to one of said pressure chambers and duct means extending between said pressure chambers to communicate with each other whereby the pressure in said chambers may be balanced to adjust the axial position of said crank with said housing.

2. A stroke length adjusting device for a mechanism converting rotary motion into reciprocating motion comprising a crank composed of two rotary bodies opposed with each other and an inclined shaft portion arranged between said two rotary bodies and made integral therewith and a cam engaged with said inclined shaft portion, said rotary bodies being provided at their outer ends with oil pressure chambers, respectively, said rotary bodies and said inclined shaft portion being extended through by a bore so as to communicate said two oil pressure chambers with each other, and the pressure balance between said two oil pressure chambers permitting said crank to displace in its axial direction.

3. A stroke length adjusting device for a mechanism converting rotary motion into reciprocating motion comprising a crank composed of two rotary bodies opposed with each other and an inclined shaft portion arranged between said two opposed rotary bodies and having a groove and an eccentric wheel engaged with said inclined shaft portion, said rotary bodies being provided at their outer ends with oil pressure chambers, respectively, said rotary bodies and said inclined shaft portion being extended through by a bore so as to communicate said two oil pressure chambers with each other, and the pressure balance between said two oil pressure chambers permitting said crank to displace in its axial direction.

4. A stroke length adjusting device for a mechanism converting rotary motion into reciprocating motion comprising a crank composed of two rotary bodies opposed with each other, an eccentric screw threaded shaft portion arranged between said two opposed bodies and a cam threadedly engaged with said eccentric screw threaded shaft portion, said rotary bodies being provided at their outer ends with oil pressure chambers, respectively, said rotary bodies and said eccentric screw threaded portion being extended through by a bore so as to communicate said two oil pressure chambers with each other, and the pressure balance between said two oil pressure chambers permitting said crank to displace in its axial direction.

5. A stroke length adjusting device for a mechanism converting rotary motion into reciprocating motion comprising a rotary shaft, an eccentric wheel secured to said rotary shaft and a swinging crank pivotally mounted on said eccentric wheel and including a crank pin slidably mounted thereon, said crank pin being operatively connected to an adjusting shaft which is provided at its outer ends with oil pressure chambers, respectively, said adjusting shaft having a bore extending therethrough so as to permit said two oil pressure chambers to communicate with each other the pressure balance between said two oil pressure chambers permitting said crank pin to displace in an axial direction of said swinging crank.

6. A stroke length adjusting device as claimed in claim 1 and comprising further a variable throttle valve opposed to an end opening of said bore communicated with one of said two oil pressure chambers and an orifice drain open to another oil pressure chamber.

7. A stroke length adjusting device as claimed in claim 1, wherein said mechanism for converting a rotary motion into a reciprocating motion is arranged in an oil tank, the oil in said oil tank being cyclically fed through an oil pressure pump to said oil pressure chambers.

8. A stroke length adjusting device as claimed in claim 7 and comprising further a cam operatively associated with said means for converting a rotary motion into a reciprocating motion and a reciprocating oil pressure pump having a plunger engaged with said cam, the oil in said oil tank being cyclically fed through said reciprocating oil pressure pump to said oil pressure chambers.

* * * * *